United States Patent Office 3,360,415
Patented Dec. 26, 1967

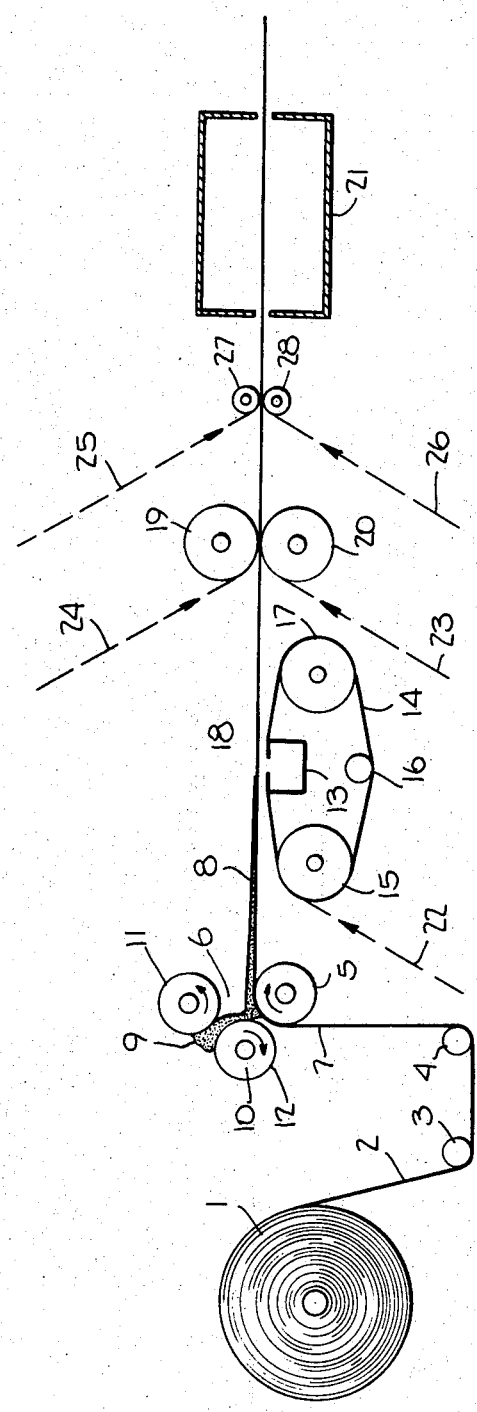

3,360,415
FOAM PRODUCT AND PROCESS
Carl Hellman, West Englewood, and John Bogdany Lodi, N.J., assignors to General Foam Corporation, New York, N.Y., a corporation of New York
Filed Oct. 21, 1963, Ser. No. 317,690
7 Claims. (Cl. 156—285)

This invention relates generally to polyurethane foams impregnated with polyvinyl chloride plastisols, more particularly to improved methods for impregnation of such foams with plastisols whereby the impregnant is uniformly distributed throughout the foam body as a coating on the cell walls.

This invention is especially adapted for the impregnation of foams having an intercommunicating cell structure. These foams are generally known in the art as open cell foams, although the term does not imply the complete absence of closed cells.

Polyurethane foams are well known in the art. They may be prepared, for example, by reaction between polyethers or polyesters having a plurality of hydroxyl groups in the molecule and a diisocyanate such as tolylene diisocyanate 4,4'-diphenylmethane diisocyanate. The reaction may be catalyzed by the presence of for example, a tertiary amine catalyst such as triethylamine, trimethylamine or N-methylmorpholene. The foams are resilient, cellular structures and are used extensively in the production of many useful products. In many uses, they are favored over other foam materials such as rubber because of their improved load bearing capacity as well as abrasion and flame resistance. It is often desirable to improve the physical and chemical properties of polyurethane foams and this is often accomplished by impregnating the foam body with various selected materials. Polyvinyl chloride and polyvinyl acetate are often used as impregnants to improve the heat sealing properties, color stability and mechanical characteristics of the foam. In order to obtain maximum effectiveness from the impregnant, it is, of course, desirable that the same be uniformly distributed throughout the foam body. For example, if the impregnated foam is to be heat sealed to a laminating layer, e.g. a textile, uniform impregnation is essential to obtaining the best possible bond.

The term "plastisols" is used herein and as defined in the art, refers to compositions containing finely divided polymer in a liquid organic plasticizer for the polymer. At ordinary temperatures, polymer particles are insoluble or only very slightly soluble in the plasticizer and the compositions are fluid, but upon heating to an elevated temperature, the polymer particles undergo fusion and solvation in the plasticizer and upon subsequent cooling, a plasticized solid results.

A number of plasticizers for use in the preparation of polyvinyl chloride plastisols are known in the art. Illustrative of some of the well known organic plasticizers are tricresyl phosphate, dioctyl phosphate, and phthalate plasticizers such as di-2-ethylhexyl phthalate. These plasticizers, either alone or as mixtures containing two or more plasticizers, are used in the practice of this invention.

Several methods have been devised for impregnating foamed polyurethane with plastisols. No completely satisfactory method has as yet been discovered. In one well known procedure, a foamed polyurethane web is passed into a container containing the impregnant and equipped with pressure rolls. The rolls squeeze out the air in the cells of the foam by crushing. When the foam expands within the container under the surface of the impregnant, the latter is forced into the cells and replaces the air in the foam body. The procedure does not permit accurate metering of the amount of the impregnant which goes into the foam. Therefore, it is difficult to control the quality of the final product.

Often, more impregnant than desired is taken up by the foam. Attempts have been made to squeeze out the excess impregnant by passing the impregnated foam between pressure rolls before curing. While this procedure does make it possible to regulate the weight of impregnant in the final product with improved accuracy, it contributes to the non-uniformity of the final product because more impregnant is squeezed out of some segments of the foam body than others.

Another procedure which has been suggested is to coat both sides of the foam with impregnant and to then pass the foam through pressure rolls. This process does not provide a uniformly impregnated product because air tends to be trapped in the interior cells of the foam body thus inhibiting proper impregnation of these cells.

In still another procedure which has been suggested, one surface of the foam is coated with impregnant and suction is applied to the opposite surface to draw the impregnant into the foam body. This procedure, however, is extremely difficult to regulate. If the density of the impregnant and the degree of suction are not carefully controlled, either the impregnant does not completely permeate the foam body or some of it passes completely through the foam and may clog the operating mechanism. Often the foam body itself is not homogeneous and both effects are observed, the impregnation is not complete in some areas, while in others, the impregnant passes completely through the foam. These effects, of course, make it extremely difficult to meter the amount of impregnant.

A process by which a plastisol impregnant can be uniformly distributed throughout a foam body while accurately controlling the amount of impregnant used has been a long felt need in the foam industry so as to permit the economic production of maximum quality products. This invention provides a method whereby polyurethane foams can be uniformly and economically impregnated with accurately metered amounts of plastisols of polyvinyl chloride including homopolymers and copolymers thereof containing up to 15% of the modifying monomer, for example alkylene monomers such as vinyl acetate, vinyl stearate, diethyl maleate, vinylidene chloride and others.

In accordance with this invention, a metered amount of plastisol is first coated on one surface, for example, the top surface of a foam web and suction is applied to the opposite surface to draw the plastisol into the web and to coat the cell walls thereof by permeating to at least 50% of the depth. Pressure is then applied to force the impregnanet into the balance of the web. Although it is possible to permeate most of the foam body, for example, up to 95% in the suction step, it is preferred to permeate from about 60% to about 80% of the foam body so as to minimize the danger of sucking the impregnant completely through the foam in its less dense sections. Although partial permeation of somewhat less than 50% of the foam body can be tolerated, it has been found that if substantially less than 50% is filled during the suction step, the impregnant is not uniformly distributed during passage of the web through the pressure rolls.

After the suction step, the partially impregnated web is subjected to pressure, for example, by passing through the nip of superimposed pressure rolls with the result that the impregnant is uniformly distributed in the balance of the foam body. There is substantially no opportunity for air to be trapped within the foam body since it is forced out through the bottom surface while the impregnant is forced downwardly from the top surface. This is completely unlike the situation where the impregnant is forced into the foam body from both surfaces and air is trapped in the interior. Uniform impregnation is completed by mechanically forcing the impregnant to flow into the cell walls of the portion of the foam body not impregnated during the vacuum application.

A special advantage of this invention is that the foam may be originally coated with a metered quantity of the impregnant. The invention, therefore, permits accurate metering of the amount of impregnant with substantially no waste.

The method of this invention may be more fully understood by reference to the accompanying drawing which illustrates schematically one embodiment of an apparatus for practicing this invention.

In the figure, 1 is a roll of polyurethane foam from which web 2 is unrolled and passes around guide rolls 3, 4 and 5 to coating station 6. At coating station 6, its top surface 7 is coated with a layer of plastisol impregnant 8 from reservoir 9 formed by coating roll 10 and metering roll 11. The surface 12 of the former roll picks up the impregnant and transfers it to the top surface of the web 2. Web 2 with the surface layer of impregnant 8 is then guided to vacuum box 13 by an open mesh continuous belt 14 which revolves around rolls 15, 16 and 17. As web 2 passes over slit 18 in vacuum box 13, sufficient suction is applied to suck the impregnant 8 into the foam body to permeate at least 50% of the void volume.

The partially permeated web 2 is then guided through a pair of superimposed pressure rolls 19 and 20 where sufficient pressure is applied to force the impregnant 8 into the remainder of the foam body. The impregnated web 2 is then guided through curing oven 21 maintained at the proper temperature to at least partially cure the plastisol and produce the final product.

If desired, a second web, for example, a fabric can be laminated to web 2. Lamination may be on either surface. Dotted lines 22, 23, 24, 25 and 26 illustrate alternate stations for bringing the laminating web into surface contact with foamed web 2. If the laminating web is to be applied as illustrated by lines 25 and 26 additional rolls 27 and 28 will be used. These latter rolls function both as guide rolls and as pressure rolls to aid adhesion of the laminating web to the impregnated foam.

Although this invention is generally applicable to the uniform impregnation of foams of varying depths, its most practical application is to foams which are from about $3/32$ inch to about 4 inches thick. The practice of the invention requires careful control of the vacuum applied to draw the plastisol into the foam so as to effect proper partial impregnation without drawing the impregnant completely through the foam. It requires also careful control of the viscosity of the plastisol and the pressure used to complete the impregnation of the foam. The vacuum at the vacuum box is preferably from about 3 to 14 inches of water although the vacuum may be somewhat more or less than this preferred range without appreciably effecting the result. The viscosity of the plastisol is relatively low, i.e. less than 1000 centipoises. The preferred range is from about 250 to about 700 centipoises. The pressure applied by the pressure rolls is generally of the order of from about 10 to about 30 pounds per linear inch.

The viscosity of polyvinyl chloride plastisols which are commercially available is generally from about 5,000 to 50,000 centipoises. It is necessary, therefore, to adjust the viscosity to below 1000 centipoises for use in this invention. This may be accomplished by the addition of a low viscosity inert liquid such as a hydrocarbon which does not dissolve the polyurethane and volatilizes at a temperature no higher than the curing temperature for the selected plastisol. The preferred liquids have a Kauributanol value less than 50. Hydrocarbons which are available under the trademark Varsol from the Esso Standard Oil Company are especially useful. These products contain both aromatic and aliphatic hydrocarbons with a relatively high content of the latter by weight.

Various other standard ingredients such as pigments or stabilizers may be present in the plastisol for special purposes although they are not essential.

The vacuum is preferably applied through a narrow slit, for example, a slit from about $1/8$ to $1/2$ inch wide. The use of the slit permits higher operating speeds by focusing the vacuum over a very small area with the result that the rate at which the foam is partially impregnated is increased.

The curing temperature varies somewhat with the selected plastisol but it is usually from about 250° F. to about 350° F. The curing temperature is maintained for a sufficient length of time to effect the degree of curing desired. For most purposes, the plastisol will be completely cured but complete curing is not essential. The degree of curing may be controlled by the length of time the impregnated foam is in the curing oven. This time factor is in turn controlled by the speed of the foam in passing through the oven and/or the length of the oven. Excellent results are obtained with impregnated foams which are from $3/32$ to 4 inches thick by passing the foam through an oven approximately 80 feet in length at a speed of from about 3 to 27 yards per minute. These ranges are not critical and may be varied within very wide limits. They are only given by way of example.

A variety of useful products may be obtained by impregnating the foam body with sufficient impregnant so that in the final product the proportion of polyurethane is from about 15 to 25% by weight.

The following non-limiting examples are given by way of illustration only.

*Example I*

A roll of polyurethane foam approximately 5 feet wide and $3/8$ inch thick is coated in a continuous manner with 3.5 times its weight of a plastisol having a viscosity of approximately 480 centipoises containing the following ingredients in the parts by weight indicated:

| | |
|---|---|
| Copolymer of polyvinyl chloride containing 5% by weight polyvinyl acetate | 100 |
| Dioctyl phthalate | 100 |
| Titanium dioxide | 5 |
| Epoxidized soybean oil (stabilizer) | 5 |
| Barium-cadmium laurate (stabilizer) | 3 |
| Varsol-II | 5 |

The foam with the plastisol surface coating is passed over a $1/2$ inch slit in a vacuum box maintained at 4 inches of water pressure with the result that approximately 50% of the depth of the foam is impregnated with plastisol. The foam is then guided through the nip of the superimposed pressure rolls exerting a pressure of 25 pounds per lineal inch. From the pressure rolls the now fully and uniformly impregnated foam is guided into a curing oven 80 feet in length maintained at a substantially constant temperature of 270° F. The impregnated foam passes through the oven at a speed of 10 yards per minute to form the final product.

*Example II*

A roll of polyurethane foam approximately 5 feet wide and $1/4$ inch thick is coated in a continuous manner with 2.0 times its weight of a plastisol having a viscosity of approximately 800 centipoises containing the following ingredients in the parts by weight indicated:

| | |
|---|---|
| Homopolyne of polyvinyl chloride | 100 |
| Btuyl benzyl phthalate | 100 |

| | |
|---|---|
| Epoxidized soybean oil (stabilizer) | 5 |
| Barium-cadmium laurate (stabilizer) | 3 |
| Varsol-II | 10 |

The foam with the plastisol surface coating is passed over a ¼ inch slit in a vacuum box maintained at 10 inches of water pressure with the result that approximately 70% of the depth of the foam is impregnated with plastisol. The foam is then guided through the nip of the superimposed pressure rolls exerting a pressure of 30 pounds per lineal inch. From the pressure rolls the now fully and uniformly impregnated foam is guided into a curing oven 80 feet in length maintained at a substantially constant temperature of 300° F. The impregnated foam passes through the oven at a speed of 10 yards per minute to form the final product.

*Example III*

A roll of polyurethane foam approximately 5 feet wide and 4.0 inch thick is coated in a continuous manner with 3.0 times its weight of a plastisol having a viscosity of approximately 480 centipoises containing the following ingredients in the parts by weight indicated:

| | |
|---|---|
| Polymer of polyvinyl chloride containing maleic ester copolymer | 100 |
| Dicapryl phthalate | 100 |
| Titanium dioxide | 5 |
| Epoxidized soybean oil (stabilizer) | 5 |
| Barium-cadmium laurate (stabilizer) | 3 |
| Varsol-II | 10 |

The foam with the plastisol surface coating is passed over a ⅛ inch slit in a vacuum box maintained at 4 inches of water pressure with the result that approximately 50% of the depth of the foam is impregnated with plastisol. The foam is then guided through the nip of the superimposed pressure rolls exerting a pressure of 30 pounds per lineal inch. From the pressure rolls the now fully and uniformly impregnated foam is guided into a curing oven 80 feet in length maintained at a substantially constant temperature of 325° F. The impregnated foam passes through the oven at a speed of 3 yards per minute to form the final product.

*Example IV*

A roll of polyurethane foam approximately 5 feet wide and ⅛ inch thick is coated in a continuous manner with 3.5 times its weight of a plastisol having a viscosity of approximately 800 centipoises containing the following ingredients in the parts by weight indicated:

| | |
|---|---|
| Copolymer of polyvinyl chloride containing 15% by weight polyvinyl acetate | 100 |
| Dioctyl phthalate | 80 |
| Titanium dioxide | 5 |
| Epoxidized soybean oil (stablizer) | 5 |
| Barium-cadmium-zinc phenate (stabilizer) | 3 |
| V. M. & P. naphtha (Esso Standard Oil) | 5 |

The foam with the plastisol surface coating is passed over a ½ inch slit in a vacuum box maintained at 4 inches of water pressure with the result that approximately 80% of the depth of the foam is impregnated with plastisol. The foam is then covered with a laminating web of circular knit cotton weighing 3 ounces per square yard and the laminate is guided through the nip of the superimposed pressure rolls exerting a pressure of 10 pounds per lineal inch. From the pressure rolls the now fully and uniformly impregnated laminated foam is guided into a curing oven 80 feet in length maintained at a substantially constant temperature of 300° F. The impregnated foam passes through the oven at a speed of 6 yards per minute to form the final product.

Although a particular embodiment of the invention is herein disclosed for purposes of explanation various modifications thereof after study of this specification will be apparent to those skilled in the art to which the invention pertains. Reference should accordingly be had to the appended claims in determining the scope of the invention.

What is claimed and desired to be secured by Letters Patent is:

1. A method of uniformly impregnating an open cell polyurethane foam web with a polyvinyl chloride plastisol having a viscosity of from about 250 to about 1,000 centipoises which method comprises partially impregnating the foam by depositing the plastisol on one surface thereof applying suction to the other surface so as to impregnate half or more of the thickness of the web and thereafter guiding the partially impregnated foam through pressure applying means to apply sufficient pressure to complete the impregnation of the foam.

2. A method of uniformly impregnating an open cell polyurethane foam web with a polyvinyl chloride plastisol having a viscosity of from about 250 to about 1,000 centipoises which method comprises partially impregnating the foam by depositing the plastisol on one surface thereof applying suction to the other surface so as to impregnate half or more of the thickness of the web and thereafter guiding the partially impregnated foam through the nip of pressure rolls to apply sufficient pressure to complete the impregnation of the foam.

3. A method of uniformly impregnating an open cell polyurethane foam web from about 3/32 to about 4 inches thick with a polyvinyl chloride plastisol having a viscosity of from about 250 to about 1,000 centipoises which method comprises partially impregnating the foam by depositing the plastisol on one surface thereof applying suction of from about 3 to about 14 inches of water to the other surface so as to impregnate at least 50% and up to about 95% of the thickness of the web and thereafter guiding the partially impregnated foam through the nip of pressure rolls to apply pressure of from about 10 to about 30 pounds per lineal inch to the foam and thereby complete the impregnation.

4. A method as in claim 3 wherein the polyvinyl chloride is a homopolymer.

5. A method as in claim 3 wherein the polyvinyl chloride is a copolymer containing up to 15% of a modifying vinyl monomer.

6. A method of producing a polyurethane laminated product comprising a uniformly impregnated polyurethane web having a second layer laminated therein which method comprises uniformly impregnating an open cell polyurethane foam web with a polyvinyl chloride plastisol having a viscosity of from about 250 to about 1,000 centipoises by depositing the plastisol on one surface of the said foam web, applying suction to the other surface so as to impregnate about half or more of the thickness of the web, applying said second layer to one surface of said web and thereafter guiding the partially impregnated foam having the second layer thereon through the nip of pressure rolls to complete the impregnation of the foam and to laminate the said second layer to the said web.

7. A method of producing a polyurethane laminated product comprising a uniformly impregnated polyurethane web having a second layer laminated thereon which method comprises uniformly impregnating an open cell polyurethane foam web from about 3/32 to about 4 inches thick with a polyvinyl chloride plastisol having a viscosity from about 250 to about 1,000 centipoises by depositing the plastisol on one surface of said foam web, applying suction of from about 3 to about 14 inches of water to the other surface so as to impregnate at least 50% and up to about 95% of the thickness of the web, applying said second layer to one surface of said web and thereafter guiding the partially impregnated foam having the second layer thereon through the nip of pressure rolls to apply pressure of from about 10 to about 30 pounds per lineal inch to the foam to complete the impregnation of the foam and to laminate the said second layer to the said web.

References Cited

UNITED STATES PATENTS

| | | | |
|---|---|---|---|
| 2,605,204 | 7/1952 | Benedict et al. | 154—139 |
| 3,043,738 | 7/1962 | Demeter et al. | 156—285 |
| 3,061,480 | 10/1962 | Schickedanz | 156—79 X |
| 3,148,076 | 9/1964 | Snyder | 156—322 |
| 3,257,263 | 6/1966 | Miller | 161—119 |
| 2,806,812 | 9/1957 | Merz | 156—214 |

FOREIGN PATENTS 821,537  7/1956  Great Britain.

EARL M. BERGERT, *Primary Examiner.*

D. SCHWARTZ, R. A. KILLWORTH,
*Assistant Examiners.*